United States Patent
Krautheim

(10) Patent No.: US 8,814,524 B2
(45) Date of Patent: Aug. 26, 2014

(54) WHEEL FORMED FROM A BLADED RING AND DISK

(75) Inventor: Michael Stephen Krautheim, Fountaintown, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 745 days.

(21) Appl. No.: 12/636,399

(22) Filed: Dec. 11, 2009

(65) Prior Publication Data

US 2010/0150725 A1 Jun. 17, 2010

Related U.S. Application Data

(60) Provisional application No. 61/201,497, filed on Dec. 11, 2008.

(51) Int. Cl.
- *F01D 5/32* (2006.01)
- *F01D 5/04* (2006.01)
- *B23P 15/00* (2006.01)
- *F01D 5/30* (2006.01)

(52) U.S. Cl.
CPC ............. *B23P 15/006* (2013.01); *F01D 5/048* (2013.01); *F01D 5/3015* (2013.01); *F01D 5/326* (2013.01)
USPC ..................................... 416/220 R

(58) Field of Classification Search
USPC .................... 416/219 R, 220 R, 220 A, 219 A
See application file for complete search history.

(56) References Cited

U.S. PATENT DOCUMENTS

| | | | |
|---|---|---|---|
| 3,305,166 A * | 2/1967 | Castle | 415/198.1 |
| 4,480,958 A * | 11/1984 | Schlechtweg | 416/220 R |
| 4,796,343 A | 1/1989 | Wing | |
| 4,802,824 A * | 2/1989 | Gastebois et al. | 416/193 A |
| 4,803,893 A | 2/1989 | Bachinski | |
| 4,826,645 A | 5/1989 | Angus | |
| 4,923,370 A * | 5/1990 | Larson et al. | 416/95 |
| 5,310,317 A | 5/1994 | Bailey et al. | |
| 5,431,536 A | 7/1995 | By et al. | |
| 5,960,625 A | 10/1999 | Zdvorak, Sr. | |
| 6,132,175 A | 10/2000 | Cai et al. | |
| 6,322,322 B1 | 11/2001 | Rhodes et al. | |
| 6,488,473 B1 * | 12/2002 | Lee et al. | 416/220 R |
| 6,542,859 B1 | 4/2003 | Burns et al. | |
| 6,551,372 B1 | 4/2003 | Ewing et al. | |
| 6,837,686 B2 | 1/2005 | Di Paola et al. | |
| 6,969,238 B2 | 11/2005 | Groh et al. | |
| 2004/0045936 A1 | 3/2004 | Davis et al. | |
| 2005/0000091 A1 | 1/2005 | Ockborn et al. | |
| 2005/0118028 A1 | 6/2005 | Matheny et al. | |
| 2005/0180852 A1 | 8/2005 | Goldfinch | |
| 2007/0059181 A1 | 3/2007 | Klingels et al. | |

* cited by examiner

*Primary Examiner* — Edward Look
*Assistant Examiner* — Adam W Brown
(74) *Attorney, Agent, or Firm* — Krieg DeVault LLP

(57) ABSTRACT

A wheel is constructed from a disk disposed for rotation about an axis and a ring with a plurality of blades being connectable to the disk. The wheel is operable for pumping, compressing, or expanding fluid in a turbomachine. The disk is configured to receive at least a portion of the ring within the disk and be coupled using a protrusion or protrusions. The protrusion can be configured to prevent relative movement between the disk and the ring. In some forms a bracket can be extended between the ring and disk to prevent relative movement.

20 Claims, 5 Drawing Sheets

WHEEL FORMED FROM A BLADED RING AND DISK

CROSS REFERENCE TO RELATED APPLICATIONS

The present application claims the benefit of U.S. Provisional Patent Application 61/201,497, filed Dec. 11, 2008, and is incorporated herein by reference.

TECHNICAL FIELD

The present invention relates to compressor and turbine wheels for a turbomachine, and more particularly to wheels having a separate bladed ring and disk.

BACKGROUND

Axial compressor wheels are typically formed with disks having separate blades connected thereto or a disk having blades integrally formed therewith (i.e. Blisk). Axial turbine wheels typically include individual turbine blades connected to a separate disk. Radial compressor and turbine wheels typically have unitary non-separable construction of the blades and disk.

One problem associated with prior art wheels is that undesirable design tradeoffs in material selection and wheel construction have been made. For example, the disk may operate at relatively low temperature and under relatively high stress generated by centripetal loading. While on the other hand the blades may operate in a relatively higher temperature environment and are subjected to unsteady aerodynamic loading which can cause failure due to high cycle fatigue and the like. The present invention discloses a unique solution to overcome these and other problems associated with the prior art.

SUMMARY

One embodiment of the present invention is a unique turbomachinery wheel. Other embodiments include apparatuses, systems, devices, hardware, methods, and combinations for connecting bladed rings with disks. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
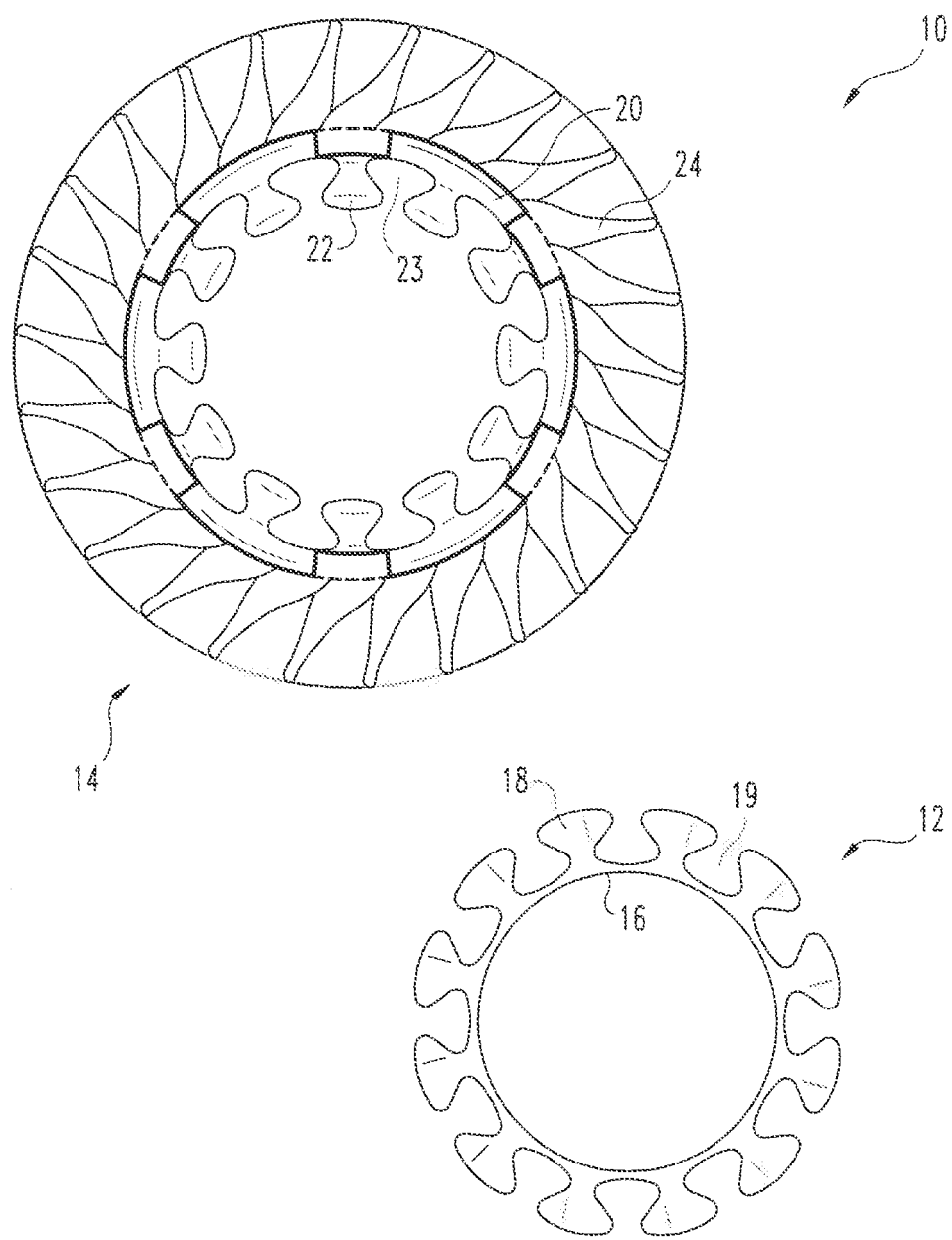
FIG. 1 is an end view of a bladed ring and a disk.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, a wheel 10 is defined by a separate disk 12 and a bladed ring 14. In one form the bladed ring 14 is releasably connectable to the disk 12 such that the bladed ring 14 can be removed from and reinstalled to the disk 12 with simple mechanical connections as will be disclosed in more detail below. In this exemplary embodiment, the wheel 10 is illustrated as a radial wheel, however it should be to be understood that axial wheels are also contemplated by the present invention. The disk 12 is connectable to a rotatable shaft (not shown) that is operable for rotating the wheel 10. Though the disk 12 is illustrated having a relatively small thickness between an edge of a pocket 19 and a radially inner portion of the disk, in other embodiments the disk 12 can have any variety of other thicknesses. In some forms, the disk 12 can be solid and may not have a hollow interior. The disk 12 can be coupled with a rotatable shaft such as can be found within turbomachinery, to set forth just one non-limiting example. The shaft can be used to transfer power between the wheel 10 and other components likewise coupled to the shaft.

In the illustrative embodiment the disk 12 includes a barrel 16 with a plurality of connecting members 18 such as dovetail joints and fir tree joints or the like to set forth just a few non-limiting examples. In addition in the illustrative embodiment, the bladed ring 14 includes a ring 20 with connecting members 22 constructed to engage with the connecting members 18 of the disk 12 and fix the bladed ring 14 relative to the disk 12. The bladed ring 14 further includes a plurality of blades or airfoils 24 extending from the ring 20. The bladed ring, 14 can be a full 360° hoop or alternatively can be formed from a plurality of ring segments that connect with the disk 12 to form the wheel 10. The blades 24 can be integrally formed with the ring 20 such as with casting or machining or alternatively the blades 24 can be formed separately and attached to the ring 20 via mechanical connection such as brazing or welding and the like, among other types of connections.

Each of the connecting members 18 and 22 are shaped to be received within pockets 23 and 19, respectively. The pockets 19 and 23 in the illustrative embodiment are shaped complementary with the corresponding connecting member, but in other embodiments can have shapes other than complementary so long as the disk 12 and bladed ring 14 can be coupled together to prevent relative movement. Though the illustrative embodiment depicts a number of evenly spaced connecting members 18 and 22 disposed between mirror images of pockets 23 and 19, other embodiments of the connecting members 18 and 22 need not be evenly spaced, and additionally and/or alternatively need not be disposed between mirror images of pockets 23 and 19. In one non-limiting example, connecting members 18 can have a different form from connecting members 22.

Figure 2:
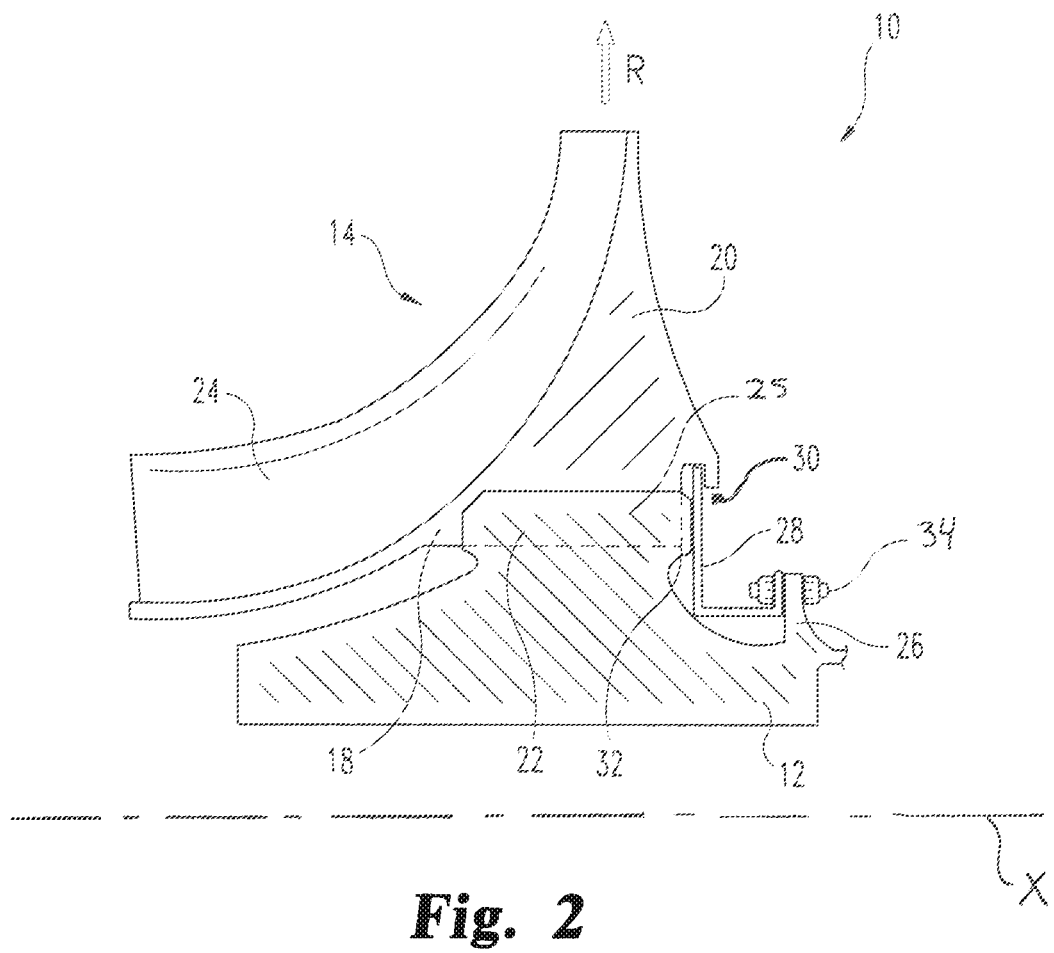
FIG. 2 is a partial cross sectional side of the bladed ring and disk of FIG. 1 coupled together.
Figure 3A:
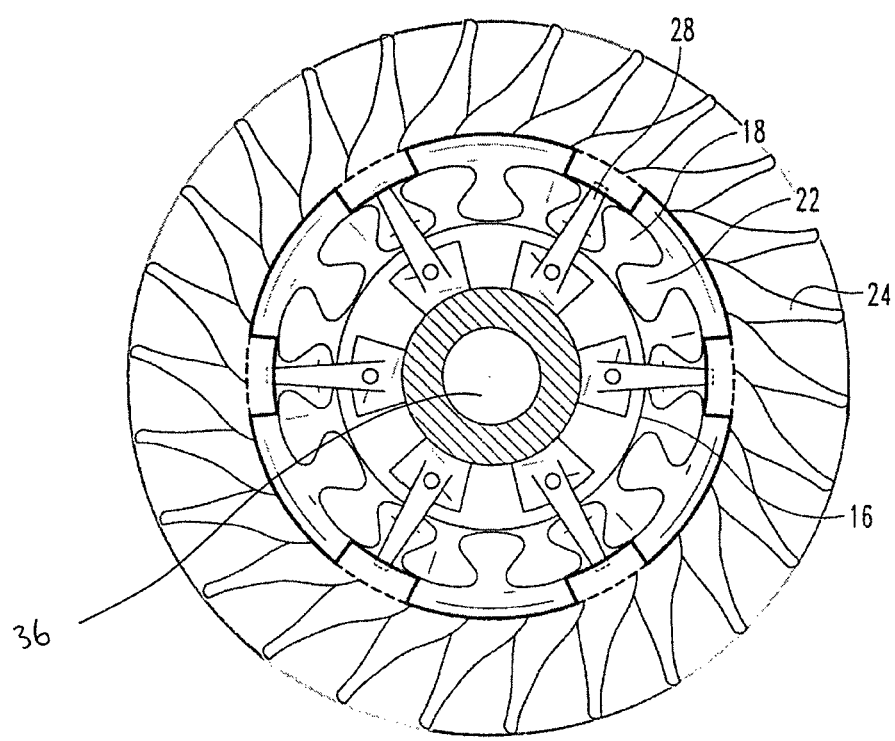
FIG. 3a is a rear view of the bladed ring and disk of FIG. 2.
Figure 3B:
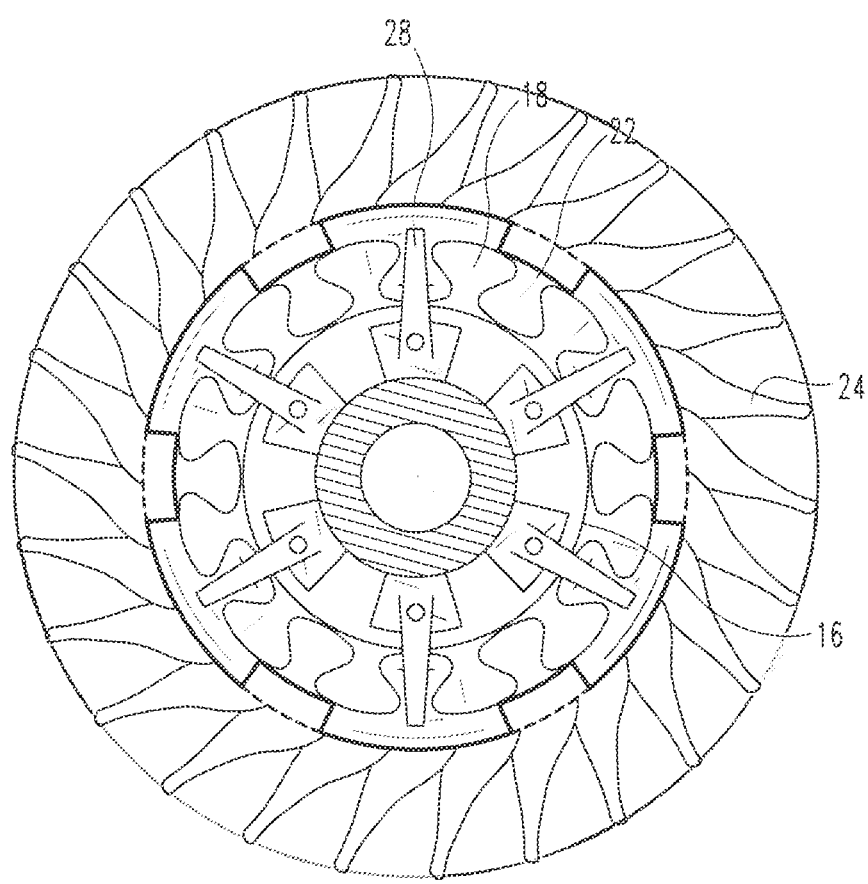
FIG. 3b is a rear view of another embodiment of the bladed ring and disk.

Referring to FIGS. 2, 3a and 3b, the disk 12 and the bladed ring 14 can be assembled together in such a manner that the connecting members 22, 18 of the disk 12 the bladed ring 14, respectively are slidingly engaged with one another to form a connecting joint 25. The connecting joint 25 discourages relative movement between the disk 12 and the bladed ring 14. In the illustrative embodiment the connecting joint 25 prevents the bladed ring 14 from separating in the radial direction represented by arrow R as the wheel 10 rotates about a rotational axis X. FIGS. 3a and 3b represent two of a number of alternative connections between the disk 12 and ring 14.

In some forms the disk 12 can include a flange 26 for connecting other components thereto. The flange 26 can include a number of flanges located at various positions around the disk 12, but in some embodiments the flange 26 can be a single flange either partially or fully extending around the disk 12. In one embodiment, a bracket 28 can be connected to the flange 26 via a threaded fastener 34 on one end and connected to the bladed ring 14 at the opposing end. In some forms the bracket 28 can be connected to the disk 12 whether or not a flange 26 is provided in the disk 12. For example, the disk 12 can have a mounting area into which a fastener may be inserted. The bracket 28 can take a variety of forms other than the arrangement depicted in the illustrative embodiment. The ring 20 can have an attachment portion such as a slot 30 formed to receive one end of the bracket 28. When the bracket 28 is assembled within the slot 30, the bracket 28 prevents the bladed ring 14 from slidingly disengaging from the disk 12. The slot 30 can include a number of slots located at various positions around the ring 20, but in some embodiments the slot 30 can be a single slot either partially or fully extending around the ring 20. In alternative forms the disk 12 can have a slot and the bladed ring 14 can have a flange. In still other alternative forms, the disk 12 and the bladed ring 14 can have the same type of structure permitting the bracket 28 to be attached. The disk 12 can include an aft stop 32 to prevent the bladed ring 14 from sliding further rearward past the stop 32 either during assembly or in operation. In this manner, the connecting joint 25 and the bracket 28 will hold the bladed ring 14 in a desired position relative to the disk 12. Other attachment mechanisms to fix the bladed ring 14 with respect to the disk 12 such as those skilled in the art would readily understand are also contemplated by the present invention.

FIG. 3a depicts one embodiment of the disk 12 coupled to the bladed ring 10 in which the bracket 28 is fitted within the slot 30 and affixed to the flange 26. FIG. 3a also discloses a shaft 36. FIG. 3b depicts just one of numerous potential alterative embodiments of the disk 12 coupled to the bladed ring 10 in which the bracket 28 is not fitted within the slot but it otherwise coupled to the bladed ring 10. Other embodiments are also contemplated herein.

Figure 4:
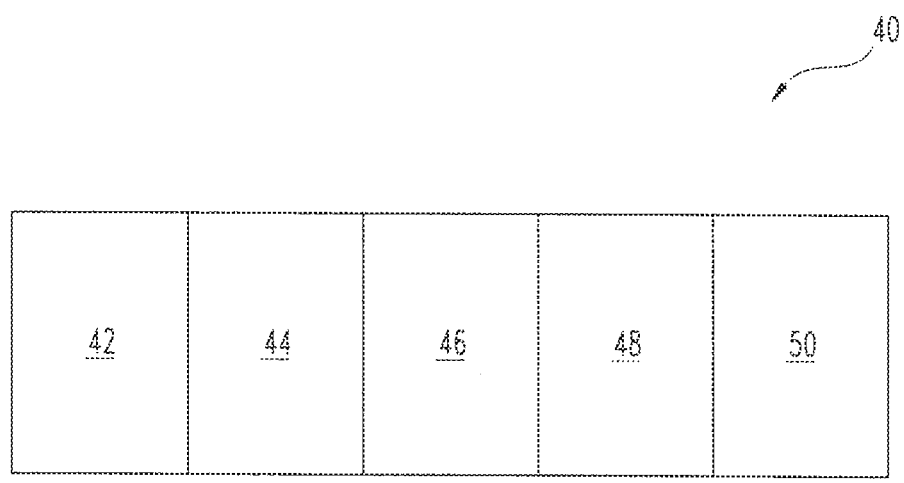
FIG. 4 is a schematic view of a gas turbine engine.

Referring now to FIG. 4, a schematic representation of the gas turbine engine 40 is shown. The engine 40 includes an inlet section 42, a compressor section 44, a combustor section 46, a turbine section 48, and an exhaust section 50. In one embodiment, the wheel 10 can be utilized in the compressor section 44 and/or the turbine section 48 of the gas turbine engine 40. Other embodiments for the wheel 10 of the present invention include but are not limited to: fluid compressor machines, fluid pumping machines, steam turbine machines and the like.

One aspect of the present invention is that the disk 12 and the bladed ring 20 can be formed from different materials and different processes. For example, if the disk 12 is more highly loaded than the bladed ring 14, the disk 12 can be formed with a higher strength material such as a nickel base alloy or the like. Conversely, the bladed ring 14 can be formed from a lighter weight material such as a titanium alloy or the like. Material selection for the various components of the wheel 10 will depend upon the application, as well as whether the wheel is a compressor wheel or a turbine wheel. Material selection can include but is not limited to: metals, metal alloys, composites, metal matrix composites (MMC), organic matrix composites (OMC), ceramics, ceramic matrix composites (CMC), composites and plastics. The disk 12 and bladed ring 14 can also be formed from various processes, which include forging from wrought material(s) or casting from cast material(s).

Another aspect of the present application provides a turbomachine wheel comprising a disk disposed for rotation about an axis, and a ring having a plurality of blades coupled thereto, the ring being releasably connectable to the disk.

A feature of the present application provides wherein the ring and the disk are formed from different materials.

Yet another feature of the present application provides wherein the ring and blades are integrally formed together.

Still another feature of the present application provides wherein the ring and blades are formed from a casting process.

A further feature of the present application provides wherein the ring and blades are formed from a machining process.

Yet a further feature of the present application provides wherein the ring and blades are made from at least one of metal, metal alloy, composite, metal matrix composite (MMC), organic matrix composite (OMC), ceramic, ceramic matrix composite (CMC), composite and plastic material.

Still yet a further feature of the present application provides wherein the ring and blades are at least partially made from a non-metal material.

Still a further feature of the present application provides wherein the ring and blades are made from different materials.

Yet another feature of the present application provides wherein the ring is held into position relative to the disk with a mechanical locking mechanism.

Still yet another feature of the present application provides wherein the locking mechanism includes a dovetail or fir tree connection.

Still another feature of the present application provides wherein the locking mechanism includes at least one bracket connecting the ring to the disk.

A further feature of the present application provides wherein one end of the bracket is positioned within a slot formed in either the ring or the disk and the other end of the bracket is mechanically fastened to the other of the ring or disk.

Yet one more feature of the present application provides wherein the ring is a 360 degree hoop.

Yet still a further feature of the present application provides wherein ring is formed from a plurality of ring segments.

Yet another feature of the present application provides wherein the wheel is operable as at least one of a compressor wheel and a turbine wheel in a gas turbine engine.

Yet still another feature of the present application provides wherein the wheel is operable in fluid compressor machines, fluid pumping machines, and steam turbine machines.

A further aspect of the present application provides an apparatus comprising a disk disposed for rotation on a shaft, a ring removably connectable to the disk, and at least one blade coupled to the ring.

A feature of the present application provides at least one retention clip for releasably locking the ring to the disk.

Another feature of the present application provides wherein the blade to ring coupling includes integrally forming the blade and ring during the manufacturing process.

Still another feature of the present application provides a gas turbine engine including a wheel formed with the disk, ring and blades.

Yet a further aspect of the present application provides a method for constructing a wheel for a turbomachine comprising forming a disk from a first material, forming a ring having a plurality of blades from at least one of the first material, a second material, or combination of several materials, and connecting the ring to the disk with a disconnectible mechanical connection.

Another aspect of the present application provides an apparatus comprising a turbomachinery component having a shaft operable to rotate when a working fluid is flowed through the turbomachinery component, a bladed ring operable to produce a pressure change in the working fluid as it flows through the turbomachinery component, the bladed ring having an annular array of blades on a first side and a coupling protrusion extending into an opening defined by a second side, and a disk located within the opening of the bladed ring and coupled with the shaft and the bladed ring, the disk having a receiving portion structured to slidingly engage the coupling protrusion.

Still another aspect of the present application provides an apparatus comprising a turbomachinery bladed ring having an interior surface forming a disk receiving opening, the gas turbine engine bladed ring structured to exchange work between a rotatable shaft and a working fluid, a disk having an outer periphery located within the disk receiving opening of the gas turbine engine bladed ring, a coupling member opening formed in at least one of the disk or gas turbine engine bladed ring, and a coupling member inserted into the coupling member opening that extends radially between the disk and the gas turbine engine bladed ring to discourage relative movement between the disk and gas turbine engine bladed ring.

Still a further aspect of the present application provides an apparatus comprising a gas turbine engine bladed ring, a disk located radially inward of the gas turbine engine bladed ring, and means for coupling the disk to the gas turbine engine bladed ring. Yet a still further aspect of the present application provides a method comprising moving a bladed ring having a plurality of protrusions into proximity to a disk, aligning the plurality of protrusions with a plurality of corresponding openings in the disk, and slidingly coupling the plurality of protrusions with the corresponding openings in the disk to create a turbomachinery flow device.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus comprising:
    a turbomachinery component having a shaft operable to rotate when a working fluid is flowed through the turbomachinery component;
    a bladed ring operable to produce a pressure change in the working fluid as it flows through the turbomachinery component, the bladed ring having a hoop continuous construction that includes a hoop monolithic continuous ring of unitary construction, an annular array of blades on a first side of the ring, and a coupling protrusion extending into an opening defined by a second side of the ring that is opposite that of the first side of the ring; and
    a disk located within the opening of the bladed ring and coupled with the shaft and the bladed ring, the disk having a receiving portion structured to slidingly engage the coupling protrusion.

2. The apparatus of claim 1, which further includes a gas turbine engine having the turbomachinery component.

3. The apparatus of claim 1, wherein the turbomachinery component is a centrifugal flow component.

4. The apparatus of claim 1, wherein the bladed ring is made of a first material and the disk is made of a second material.

5. The apparatus of claim 1, wherein the coupling protrusion is a plurality of coupling protrusions and the opening is a plurality of openings, the coupling protrusions located between the openings spaced evenly around a circumference of the turbomachinery component.

6. The apparatus of claim 1, which further includes a retention member extending between the bladed ring and the disk, the retention member engaging a portion of the bladed ring and a portion of the disk to prevent the relative axial movement of the bladed ring and disk.

7. The apparatus of claim 6, wherein one side of the retention member is engaged with a recess of one of the bladed ring and disk.

8. The apparatus of claim 6, wherein the retention member is mechanically fastened to one of the bladed ring and disk.

9. The apparatus of claim 1, wherein the disk includes a hollow interior.

10. An apparatus comprising:
    a turbomachinery bladed ring having an integral blade and ring structure that includes an interior surface forming a disk receiving opening, the gas turbine engine bladed ring structured to exchange work between a rotatable shaft and a working fluid, and the gas turbine engine bladed ring having a hoop continuous construction that includes a hoop monolithic continuous ring of unitary construction;
    a disk having an outer periphery located within the disk receiving opening of the gas turbine engine bladed ring;
    a connecting member opening formed in at least one of the disk or gas turbine engine bladed ring; and
    a connecting member inserted into the connecting member opening that extends radially between the disk and the gas turbine engine bladed ring to discourage relative movement between the disk and gas turbine engine bladed ring;
    and
    a retention member extending between the turbomachinery bladed ring and the disk, a first portion of the retention member coupled with the turbomachinery bladed ring and a second portion of the retention member coupled with the disk, the retention member structured to discourage relative axial movement between the turbomachinery bladed ring and the disk.

11. The apparatus of claim 10, wherein the connecting member further includes an elongated stem and a lateral protrusion, and the connecting member opening further has a complementary shape to the connecting member, the connecting member discouraging relative circumferential movement between the turbomachinery bladed ring and the disk.

12. The apparatus of claim 11, wherein the elongated stem and the lateral protrusion of the connecting member is one of a dovetail configuration and a fir tree configuration.

13. The apparatus of claim 10, wherein the coupled assembly of the turbomachinery bladed ring and the disk includes a plurality of connecting members inserted within a plurality of connecting member openings.

14. The apparatus of claim 10, wherein the disk comprises an aft stop and the turbomachinery bladed ring comprises a slot, which are configured to discourage relative axial movement in respective opposite axial directions.

15. The apparatus of claim 10, wherein the first portion of the retention member is inserted into the slot of the turbomachinery bladed ring.

16. An apparatus comprising:
a gas turbine engine bladed ring having an integral construction and having a hoop monolithic continuous ring of unitary construction that includes a hoop continuous ring, an annular array of blades on a first side of the ring, and a coupling protrusion extending into an opening defined by a second side of the ring that is opposite that of the first side of the ring;
a disk located radially inward of the gas turbine engine bladed ring; and
means for coupling the disk to the gas turbine engine bladed ring.

17. A method comprising:
moving an integrally continuous bladed ring into proximity to a disk
in which the integrally continuous bladed ring has a hoop monolithic continuous ring of unitary construction that includes a hoop continuous ring, an annular array of blades on a first side of the ring, and a plurality of protrusions that extend into an opening defined by a second side of the ring that is opposite that of the first side of the ring;
aligning the plurality of protrusions with a plurality of corresponding openings in the disk; and
slidingly coupling the plurality of protrusions with the corresponding openings in the disk to create a turbomachinery flow device.

18. The method of claim 17, which further includes extending a retention member across the bladed ring and the disk to prevent relative axial movement.

19. The method of claim 18, which further includes fastening a first portion of the retention member to the turbomachinery flow device and inserting another portion of the retention member into an opening in the turbomachinery flow device.

20. The method of claim 19, which further includes repeating the method of claim 19 a plurality of times.

* * * * *